(12) United States Patent  
Ungermann et al.

(10) Patent No.: US 8,731,850 B2  
(45) Date of Patent: May 20, 2014

(54) METHOD AND DEVICE FOR DETECTING LEAKS IN THE INTAKE TRACT OF AN INTERNAL COMBUSTION ENGINE

(75) Inventors: Michael Ungermann, Linsengericht (DE); Andreas Buse, Ostfildern (DE); Dieter Schwarzmann, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 394 days.

(21) Appl. No.: 13/106,055

(22) Filed: May 12, 2011

(65) Prior Publication Data

US 2011/0282598 A1 Nov. 17, 2011

(30) Foreign Application Priority Data

May 17, 2010 (DE) .......................... 10 2010 029 021

(51) Int. Cl.  
*G01F 17/00* (2006.01)

(52) U.S. Cl.  
USPC .............................. 702/51; 702/113; 702/138

(58) Field of Classification Search  
USPC ...................... 702/51, 113, 138; 701/29, 114; 376/250; 374/4; 73/592  
See application file for complete search history.

(56) References Cited

U.S. PATENT DOCUMENTS 6,234,148 B1 * 5/2001 Hartke et al. ................. 123/447  
7,127,347 B2 * 10/2006 Moser et al. .................. 701/114  
8,463,490 B2 * 6/2013 Burkhardt et al. ........... 701/34.4

* cited by examiner

*Primary Examiner* — Elias Desta  
(74) *Attorney, Agent, or Firm* — Kenyon & Kenyon LLP

(57) ABSTRACT

A method for detecting a leak in an intake tract of an internal combustion engine involves operating the engine at two operating points and comparing a deviation of measured mass flows from expected mass flows at the first and at the second operating points.

10 Claims, 4 Drawing Sheets

METHOD AND DEVICE FOR DETECTING LEAKS IN THE INTAKE TRACT OF AN INTERNAL COMBUSTION ENGINE

CROSS REFERENCES

The present application claims the benefits under 35 U.S.C. §119 of German Patent Application No. DE 102010029021.1 filed on May 17, 2010, which is expressly incorporated herein by reference in its entirety.

FIELD OF THE INVENTION

The present invention relates to a method and a device for detecting leaks in an intake tract of an internal combustion engine.

BACKGROUND INFORMATION

Various errors may occur in the intake tract of an internal combustion which impair the performance of the engine and/or result in increased exhaust gas emissions. To correct these errors, the error that is actually present must be identified within the scope of a repair shop diagnosis. Leaks in the intake tract of the internal combustion engine which are caused by small holes or loose clamps are particularly difficult to detect and to distinguish from other errors.

Conventionally, for diagnosing the air supply system of an internal combustion engine, the mass flow into the intake tract is measured and compared to a theoretical computed mass flow. The presence of an error in the intake tract may be deduced based on the magnitude of the deviation of the measured mass flow from the theoretical computed mass flow. However, it is generally not possible to use this procedure to distinguish between various types of errors, for example an error caused by a leak in the intake tract versus some other error, for example caused by a defective valve, a slipped toothed belt, or a defective mass flow sensor.

SUMMARY

It is an object of the present invention to provide a method and a device for diagnosing internal combustion engines, which allow reliable detection of leaks in the intake tract of the internal combustion engine.

In one example embodiment of a method according to the present invention, the internal combustion engine is initially operated at a first operating point having a constant rotational speed and a first pressure difference between the ambient pressure and the pressure in the intake tract of the internal combustion engine. An expected first mass flow into the intake tract is computed for this first operating point. In addition, the actual mass flow into the intake tract is measured, and the difference between the measured mass flow and the computed mass flow is ascertained.

In a second step, the internal combustion engine is operated at a second operating point having the same rotational speed as at the first operating point, and having a second pressure difference between the ambient pressure and the pressure in the intake tract of the internal combustion engine, the second pressure difference being different from the first pressure difference. Also for the second operating point, the expected mass flow into the intake tract is computed and the actual mass flow into the intake tract is measured. The difference between the measured and the expected mass flow at the second operating point is ascertained and compared to the difference between the measured mass flow and the expected mass flow previously determined at the first operating point.

Possible errors, and in particular a leak in the intake tract, may be deduced based on the comparison of the deviations of the measured mass flows from the mass flow which is expected at each of the two operating points.

If the difference between the pressure in the intake tract and the ambient pressure at the first operating point is greater than at the second operating point, and the absolute value of the deviation of the measured mass flow from the expected mass flow when a change is made from the first operating point to the second operating point is much smaller, the error is identified as a leak in the intake tract.

On the other hand, if there is little or no deviation of the measured mass flow from the expected mass flow during a change from the first to the second operating point, this points to some other error, for example a defective valve, a slipped toothed belt, or a defective mass flow sensor.

Using an example method according to the present invention, leaks in the intake tract of an internal combustion engine may be easily identified with high reliability and distinguished from other errors without the need for manually examining the engine and/or the intake tract.

In one specific embodiment of the method, a throttle valve situated in the intake tract is closed to the greatest extent possible when the engine is operated at the first operating point, and is completely open when the engine is operated at the second operating point. In this way, it is easily possible to set the first operating point with a large difference between the ambient pressure and the pressure in the intake tract, and to set the second operating point with the smallest possible difference between the ambient pressure and the pressure in the intake tract. The rotational speed of the engine is held constant by reducing the torque generated by the engine. This may be achieved, for example, by reducing the quantity of fuel injected into the engine, by targeted misfiring, by reducing the ignition angle, by intermittent injection, and/or by using a roller-type test stand.

In one exemplary embodiment of the method, a turbocharger is situated in the intake tract of the internal combustion engine, and the throttle valve is completely open at both operating points. A different pressure difference between the pressure in the intake tract and the ambient pressure at the first and second operating points is adjusted by regulating the turbocharger situated in the intake tract. With the aid of such a method, even engines having a turbocharger situated in the intake tract may be tested using the method according to the present invention in order to identify leaks in the intake tract.

In one specific embodiment, the expected mass flow is a function of the rotational speed of the engine and of the pressure and the temperature in the intake tract. Such a function may be stored in a memory, for example in the form of a stored reference characteristic curve which has been recorded during operation of an undamaged reference engine. Alternatively, based on theoretical considerations an analytical formula may be established for the mass flow as a function of the rotational speed of the engine and of the pressure and the temperature in the intake tract.

BRIEF DESCRIPTION OF THE DRAWINGS

The present invention is explained in greater detail below with reference to the figures.

DETAILED DESCRIPTION OF EXAMPLE EMBODIMENTS

Figure 1:
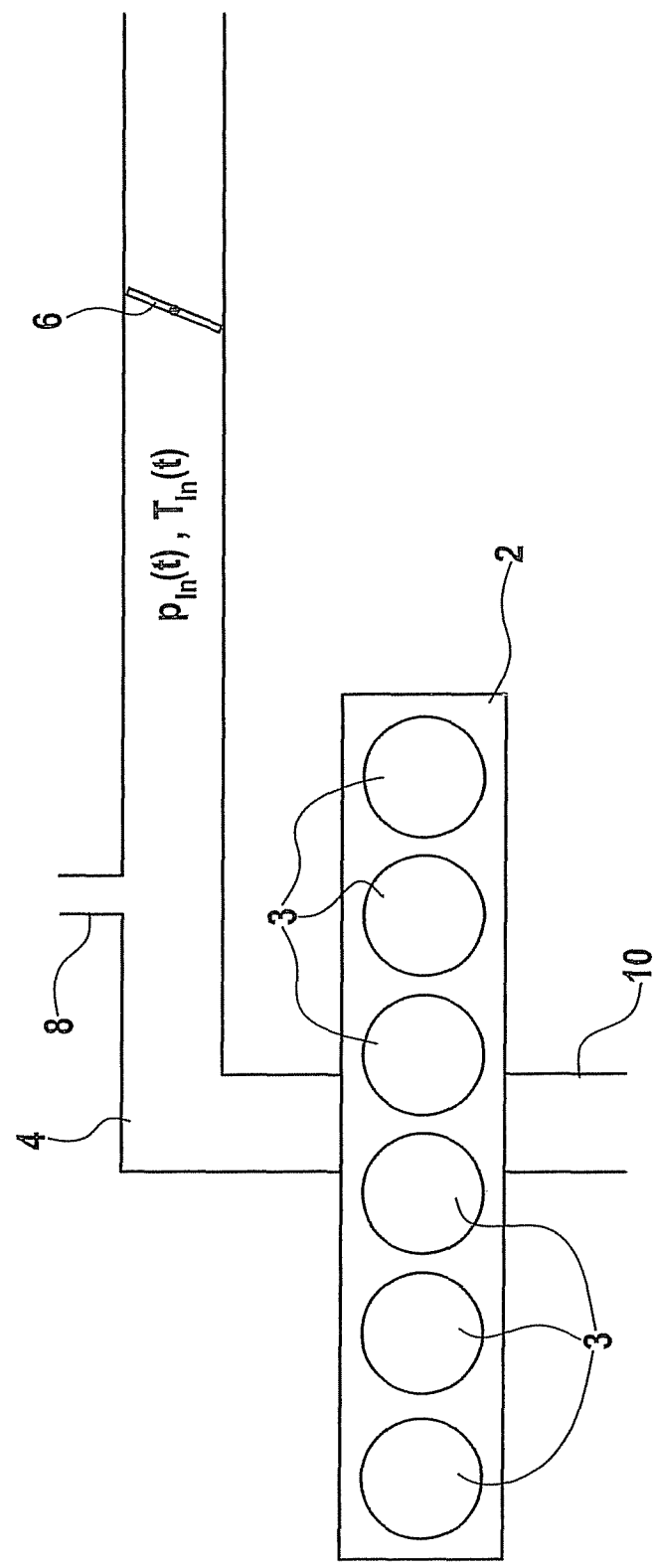
FIG. 1 schematically shows a naturally aspirated engine having an intake tract.

FIG. 1 schematically shows a naturally aspirated engine 2 having six cylinders 3, and an intake tract 4 which is designed to supply cylinders 3 of naturally aspirated engine 2 with combustion air. The exhaust gases produced during the combustion of fuel in cylinders 3 of naturally aspirated engine 2 are discharged through an exhaust tract 10 to an exhaust system, not shown in FIG. 1.

A pivotable throttle valve 6 is situated in intake tract 4. The effective cross section of intake tract 4 is settable by pivoting throttle valve 6, allowing the mass flow as well as pressure $p_{in}$ in intake tract 4 to be varied. A leak 8 in intake tract 4 is also schematically shown, through which additional ambient air flows uncontrolled into intake tract 4, independently of the setting of throttle valve 6.

Figure 2:
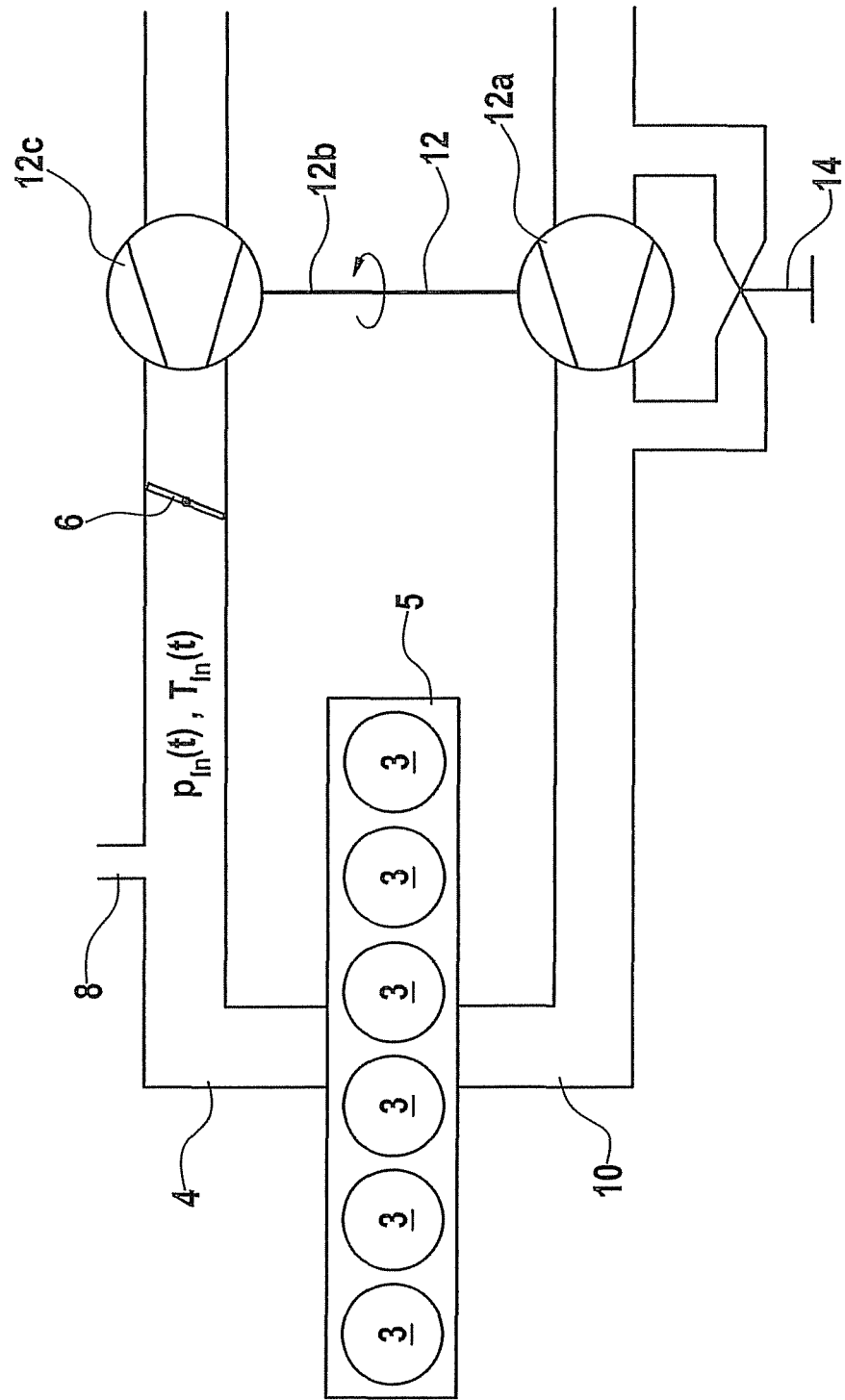
FIG. 2 schematically shows a turbocharged engine having an intake tract and an exhaust tract.

FIG. 2 schematically shows a turbocharged engine 5 having six cylinders 4, an intake tract 4, and an exhaust tract 10. The same as in the first exemplary embodiment shown in FIG. 1, intake tract 4 of turbocharged engine 5 also has a pivotable throttle valve 6 and a leak 8.

The intake and exhaust system of a turbocharged engine 5 shown in FIG. 2 differs from the intake and exhaust system of a naturally aspirated engine 2 shown in FIG. 1, in that a turbocharger 12 is additionally provided which is drivable by a turbine 12a, situated in exhaust tract 10, by exhaust gases discharged from engine 5.

Turbine 12a, which is driven by exhaust gases discharged from engine 5, is connected via a shaft 12b to a compressor 12c situated in intake tract 4 of engine 5 in such a way that compressor 12c is driven by turbine 12a via shaft 12b. Compressor 12c compresses the air drawn in by engine 5 through intake tract 4, and thus increases pressure $p_{in}$ in the region of intake tract 4 which is situated downstream from compressor 12c, i.e., between compressor 12c and engine 5.

A bypass valve 14 is situated parallel to turbine 12a of turbocharger 12 in exhaust tract 10 of turbocharged engine 5, and allows the exhaust gases discharging from turbocharged engine 5 to be partially or completely guided past turbine 12a of turbocharger 12. The operation of turbocharger 12, and thus pressure $p_{in}$, in intake tract 4, may thus be adjusted in a wide range by regulating bypass valve 14.

Figure 3:
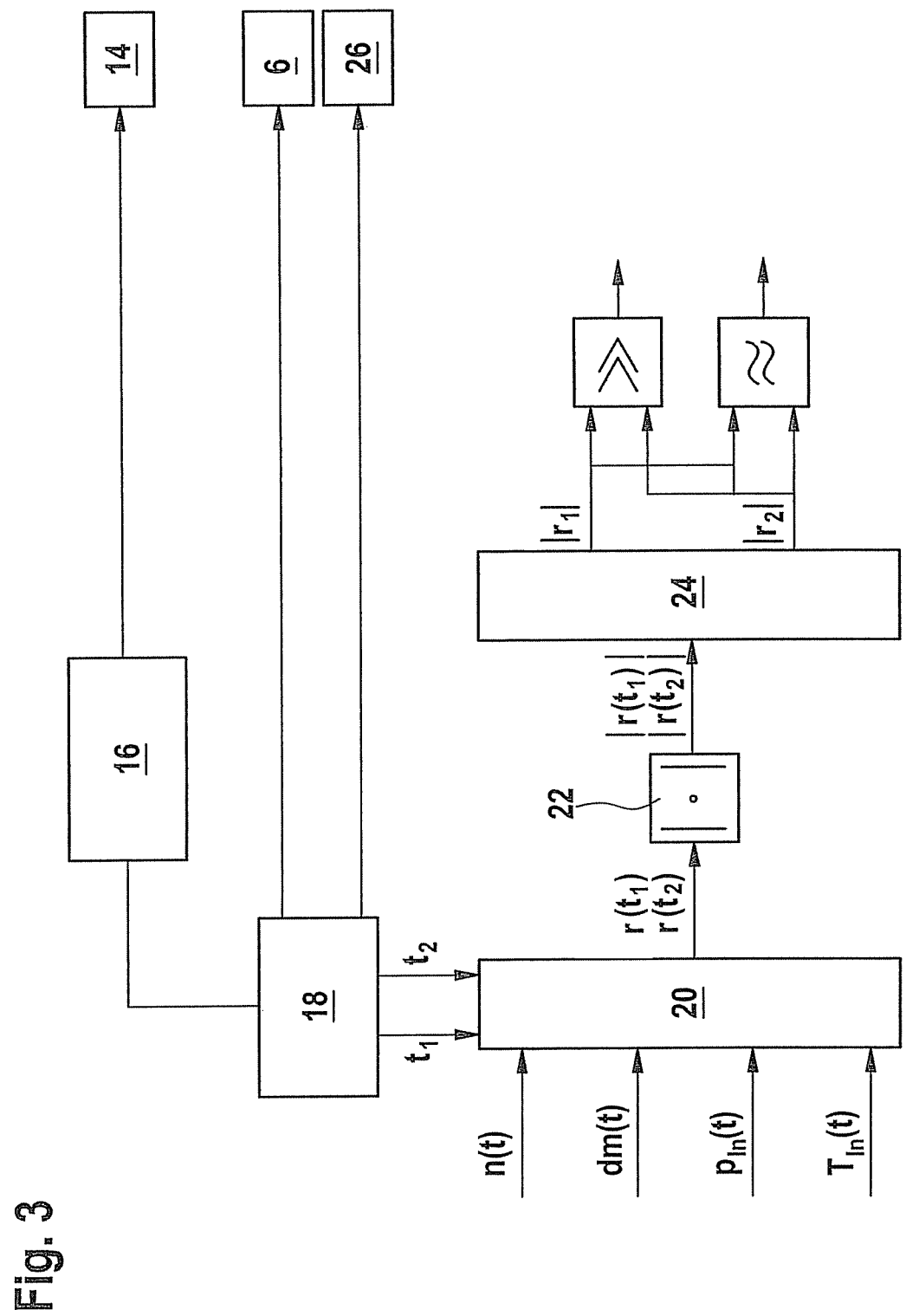
FIG. 3 shows the schematic design of a diagnostic device for carrying out an example method according to the present invention.

FIG. 3 schematically shows a block diagram of a diagnostic device for carrying out an example method according to the present invention.

The device has a sequence control system 18 which is connected to throttle valve 6 and to an engine control system 26. Engine control system 26 controls in particular the ignition, and optionally the injectors, of engine 2, 5.

If internal combustion engine 2, 5 is a turbocharged engine 5, sequence control system 18 is additionally connected to a boost pressure control system 16 which activates bypass valve 14 of turbocharger 12. If the engine is a naturally aspirated engine 2, boost pressure control system 16 and bypass valve 14 are dispensed with.

The device also has a recording unit 20 for recording the values measured for temperature $T_{in}$ (t) and pressure $p_{in}$ (t) in intake tract 4, rotational speed n (t) of engine 2, 5, and mass flow dm (t) into intake tract 4, a computing unit 22 for computing mass flow differences r (t1), r (t2), and a memory and evaluation unit 24 for evaluating computed mass flow differences r (t1), r (t2).

The example method according to the present invention is first described below, with reference to FIGS. 1 and 3 for a naturally aspirated engine 2 without a turbocharger 12.

Engine 2 is connected to sequence control system 18 and is decoupled.

Sequence control system 18 activates throttle valve 6 in such a way that the throttle valve is largely closed, i.e., closed to 10%, for example, of the maximum opening. Engine control system 26 is activated by sequence control system 18 in such a way that engine 2 runs at idle speed at a constant rotational speed of 2500 rpm or 5000 rpm, for example.

At this first operating point t1, rotational speed n of engine 2, mass flow dm (t1) into intake tract 4, pressure $p_{in}$ (t1) in intake tract 4, and temperature $T_{in}$ (t1) in intake tract 4 are measured, and an expected value $dm^{eng}$(t1) for the mass flow into intake tract 4 is computed or ascertained from a stored characteristic curve:

$$dm^{eng}(t1)=f(n(t1),p_{in}(t1),T_{in}(t1)).$$

$dm^{eng}$ (t1) may be approximated, for example, by $$dm^{eng}(t1)=p_{in}(t1)*V_E*(q_1*n(t1)+q_2/(2R*T_{in}(t1))).$$

$V_E$ is the displacement of engine 2 and R is the ideal gas constant; $q_1$ and $q_2$ are parameters which are functions of the particular engine 2, 5.

Deviation r (t1) of measured mass flow dm (t1) from computed mass flow $dm^{eng}$(t1)

$$r(t1)=dm^{eng}(t1)-dm(t1)$$

is computed and stored for subsequent evaluation.

Using the previously described approximation for $dm^{eng}$ (t1), deviation r (t) for a continuously changing operating point t may be computed from $$r(t1)=p'_{in}(t)*V_{in}/\kappa R*T_{amb})+dm^{eng}(t)-dm(t).$$

$\kappa$ is the isentropic exponent and $V_{in}$ is the volume of the intake tract. Derivative $p'_{in}(t)=dp_{in}(t)/dt$ may be approximated using an appropriate filter. The task of the filter is to damp high frequencies and pressure pulsations. Such a filter having design parameter $\tau$ is in the Laplace range:

$$p'_{in}(t) \approx \mathcal{L}^{-1}\left\{\frac{s}{\tau s+1}\mathcal{L}\{p_{in}(t)\}\right\}.$$

A second operating point t2 is set in the next step. For this purpose, throttle valve 6 and engine control system 26 are activated by sequence control system 18 in such a way that throttle valve 6 is completely open, and engine 2 is operated at the same rotational speed n as at first operating point t1, despite the fact that throttle valve 6 is now completely open.

Also at this second operating point t2, mass flow rate dm (t2) into intake tract 4, pressure $p_{in}$ (t2) in intake tract 4, and temperature $T_{in}$ (t2) in intake tract 4 are measured and an expected mass flow $dm^{eng}$ (t2) into intake tract 4 is computed. The difference $$r(t2)=dm^{eng}(t2)-dm(t2)$$

between measured mass flow dm (t2) and computed mass flow $dm^{eng}$ (t2) into intake tract 4 at second operating point t2 is computed and compared to the previously computed and stored difference r (t1) at first operating point t1.

If the absolute value of difference r (t) between computed mass flow $dm^{eng}$ (t) and measured mass flow dm (t) at first operating point t1 is much greater than at second operating point t2, $$|r(t1)|>>|r(t2)|$$

it is concluded that a leak 8 is present in intake tract 4.

If the deviation of the measured mass flow from the computed mass flow is approximately equal at both operating points t1, t2, $$|r(t1)|\approx|r(t2)|$$

it is concluded that there is no leak 8 in intake tract 4.

Threshold value s for difference d in mass flow differences r (t1), r (t2), $$d=||r(t1)|-|r(t2)||$$

which indicates a leak 8 in the exhaust tract when the threshold value is exceeded, must be determined individually for each engine 2, 5. The smaller the threshold value d, the smaller the leaks 8 which may be identified using the method; however, for a small threshold value d there is also the risk that the presence of a leak 8 may be erroneously deduced without a leak being present.

The example method may also be carried out in the reverse sequence by operating engine 2 at first operating point t1 with throttle valve 6 open, i.e., with a small pressure difference $\Delta p$ (t1) between pressure $p_{in}$ (t1) in intake tract 4 and ambient pressure $p_{amb}$, and at the second operating point with throttle valve 6 practically completely closed, i.e., with a large pressure difference $\Delta p$ (t2) between pressure $p_{in}$ (t2) in intake tract 4 and ambient pressure $p_{amb}$.

The example method for a turbocharged engine 5 differs from the example method described for a naturally aspirated engine 2 in that in the case of a turbocharged engine 5, throttle valve 6 is completely open at both operating points t1, t2, and pressure difference $\Delta p$ (t) between pressure $p_{in}$ (t) in intake tract 4 and ambient pressure $p_{amb}$ is set differently at first operating point t1 than at second operating point t2 via a different operation of turbocharger 12.

For this purpose, bypass valve 14 is largely or completely closed at first operating point t1, so that (practically) the entire exhaust gas flow from engine 5 passes through turbine 12a of turbocharger 12 and drives same, so that compressor 12c generates a high pressure $p_{in}$ (t1) in intake tract 4.

Bypass valve 14 is largely open at second operating point t2, so that a predominant portion of the exhaust gases flows from engine 5 through bypass valve 14 past turbine 12a of turbocharger 12, without driving the turbine. Compressor 12b of turbocharger 12 then generates only slight additional pressure in intake tract 4, and pressure $p_{in}$ (t2) in intake tract 4 is less than pressure $p_{in}$ (t1) in intake tract 4 at first operating point t1.

Figure 4:
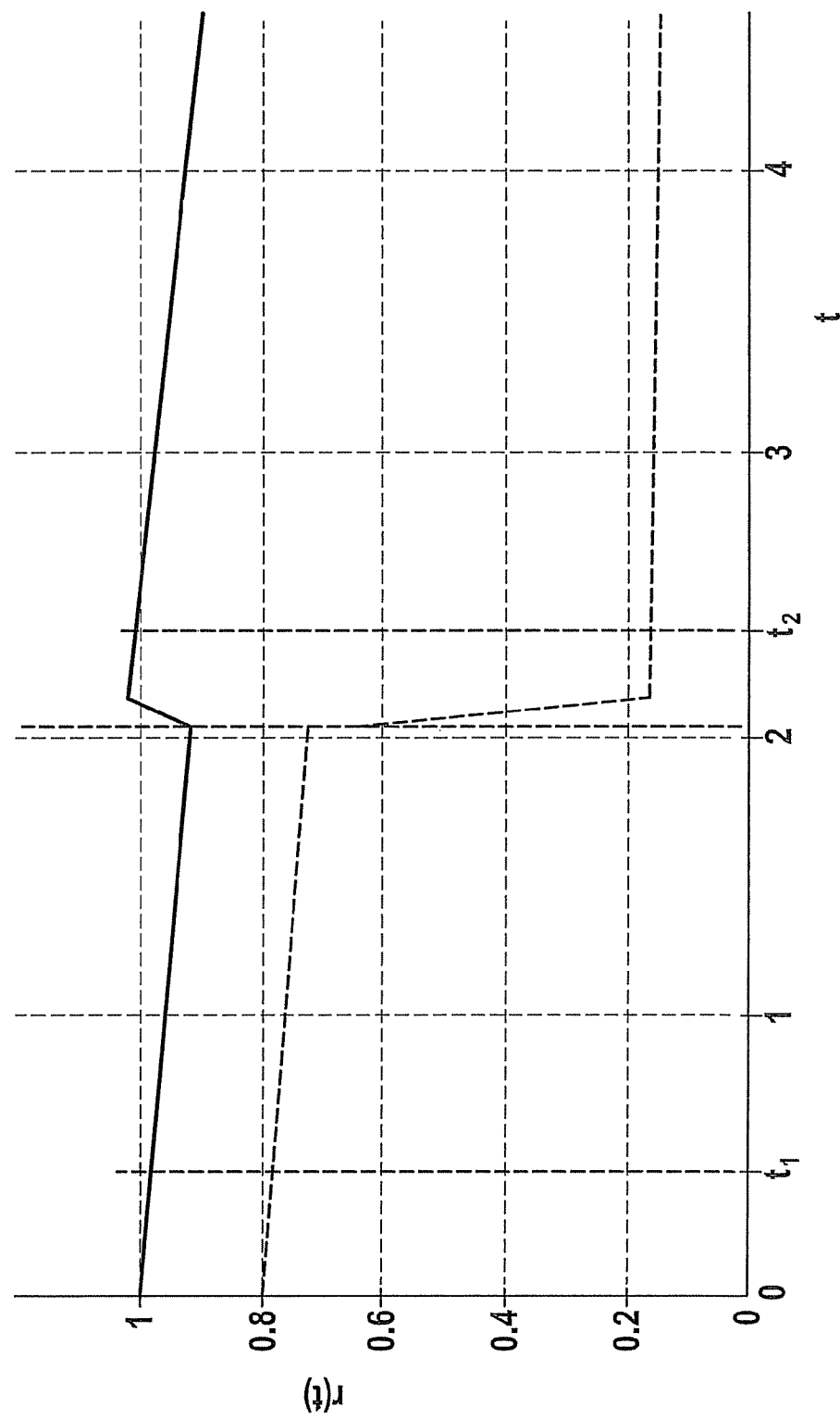
FIG. 4 shows the curve of the pressure difference at various operating points.

FIG. 4 shows an example of the curve of mass flow difference r (y axis) between measured mass flow dm (t) and expected mass flow $dm^{eng}$(t) in intake tract 4 of a naturally aspirated engine 2 when there is a leak 8 in intake tract 4 (dashed line) and when there is a defective valve (solid line), as a function of time t (x axis).

When a transition is made from a first to a second operating state at point in time t=2, mass flow difference r increases when there is a defective valve (solid line). On the other hand, when there is a leak 8 in intake tract 4, mass flow difference r (dashed line) markedly decreases when the operating state changes. In addition to the opposite algebraic sign of the change in mass flow difference r (dashed line), the absolute value of the relative change in mass flow difference r is much greater for a leak 8 in intake tract 4 (in the example shown in FIG. 4, approximately 0.6) than for a defective valve (solid line).

Thus, the type of error in intake tract 4 may be deduced based on the magnitude of the change in mass flow difference r at the transition from first operating state t1 to second operating state t2.

In particular, a leak 8 in intake tract 4 may be identified and distinguished from some other error, such as that caused by a defective valve, for example.

An example method according to the present invention and an example device according to the present invention thus allow reliable detection of leaks 8 in intake tract 4 of an internal combustion engine 2, 5.

What is claimed is:

1. A method for detecting a leak in an intake tract of an internal combustion engine, comprising:
    operating the internal combustion engine at a first operating point having a rotational speed and a first pressure difference between an ambient pressure and a pressure in the intake tract of the internal combustion engine;
    computing, by a processing device, a first expected mass flow into the intake tract;
    measuring, by the processing device, a first mass flow into the intake tract and computing a first difference between the measured first mass flow and the first expected mass flow;
    operating the internal combustion engine at a second operating point having the same rotational speed and a second pressure difference between the ambient pressure and the pressure in the intake tract of the internal combustion engine, the second pressure difference being different from the first pressure difference;
    computing, by the processing device, a second expected mass flow into the intake tract;
    measuring, by the processing device, a second mass flow into the intake tract and computing a second difference between the measured second mass flow and the second expected mass flow; and
    comparing, by the processing device, the first and second mass flow differences ascertained at the first and at the second operating point.

2. The method as recited in claim 1, wherein a throttle valve situated in the intake tract is closed to the greatest extent possible at one operating point, and is open at another operating point.

3. The method as recited in claim 1, wherein the throttle valve is completely open at both operating points, and the pressure in the intake tract is adjustable by regulating a turbocharger situated in the intake tract.

4. The method as recited in claim 1, wherein the rotational speed between the first and the second operating point is held constant at least one of by reducing a quantity of fuel supplied to the engine, by misfiring, by reducing the ignition angle, by intermittent fuel injection, and by using a roller-type test stand.

5. The method as recited in claim 1, wherein a leak in the intake tract is identified when the first mass flow difference at the first operating point differs from the mass flow difference at the second operating point.

6. The method as recited in claim 1, wherein the expected mass flow is a function of the rotational speed of the engine, the pressure, and a temperature in the intake tract.

7. The method as recited in claim 1, wherein the expected mass flow is stored in a memory in a form suitable for presentation as a characteristic curve.

8. A device for detecting a leak in an intake tract of an internal combustion engine, the device configured to perform the steps of: operating the internal combustion engine at a first operating point having a rotational speed and a first pressure difference between an ambient pressure and a pressure in the intake tract of the internal combustion engine; computing a first expected mass flow into the intake tract; measuring a first mass flow into the intake tract and computing a first difference between the measured first mass flow and the first expected mass flow; operating the internal combustion engine at a second operating point having the same rotational speed and a second pressure difference between the ambient pressure and the pressure in the intake tract of the internal combustion engine, the second pressure difference being different from the first pressure difference; computing a second expected mass flow into the intake tract; measuring a second mass flow into the intake tract and computing a second difference between the measured second mass flow and the second expected mass flow; and comparing the first and second mass flow differences ascertained at the first and at the second operating point.

9. The device as recited in claim 8, wherein the device is configured to activate at least one of a throttle valve and an engine control system.

10. The device as recited in claim 8, wherein the device is adapted to activate a boost pressure control system.

\* \* \* \* \*